United States Patent [19]

White, Jr.

[11] 4,330,921

[45] May 25, 1982

[54] INSULATED WALL SECTIONS AND METHODS OF AND APPARATUS FOR PREFABRICATING THE SAME

[76] Inventor: Olin N. White, Jr., Rte. #1, Ottawa Lake, Mich. 49276

[21] Appl. No.: 141,185

[22] Filed: Apr. 17, 1980

Related U.S. Application Data

[62] Division of Ser. No. 944,268, Sep. 21, 1978, abandoned.

[51] Int. Cl.[3] ........................ B23P 11/02; B25B 27/14; B25B 5/14

[52] U.S. Cl. ...................................... 29/432; 29/283.4; 29/446; 29/155 R; 29/281.4; 52/404; 52/309.4; 52/809; 227/152; 428/76; 269/118

[58] Field of Search ........... 29/446, 784, 432, 163.5 F, 29/281.4, 281.3, 155 R; 52/406, 407, 404, 809, 92, 309.11, 309.4; 428/71, 76; 269/111, 112, 118, 119, 113, 114; 227/152

[56] References Cited

U.S. PATENT DOCUMENTS

| | | | |
|---|---|---|---|
| 1,685,244 | 9/1928 | Rozenzweig | 269/119 X |
| 2,703,443 | 3/1955 | Lee | 428/76 X |
| 3,169,759 | 2/1965 | Mehaffy | 269/118 X |
| 3,462,897 | 8/1969 | Weinratt | 52/92 |
| 3,573,145 | 3/1971 | Witkosky et al. | 428/76 |
| 3,581,367 | 6/1971 | Zeinetz | 29/281.4 X |
| 3,629,046 | 12/1971 | Gilbert | 428/71 |
| 3,678,558 | 7/1972 | Fredericks | 29/446 X |
| 3,736,715 | 6/1973 | Krumwiede | 52/309.11 |
| 3,793,692 | 2/1974 | Tate et al. | 29/163.5 F |
| 4,068,434 | 1/1978 | Day | 52/404 X |

FOREIGN PATENT DOCUMENTS

| | | | |
|---|---|---|---|
| 255645 | 2/1949 | Switzerland | 52/404 |
| 407641 | 3/1934 | United Kingdom | 269/119 |

*Primary Examiner*—Charlie T. Moon
*Attorney, Agent, or Firm*—Charles W. Swope

[57] ABSTRACT

An insulated wall section for prefabricated buildings; a method of producing such sections that involves assembling, maneuvering and securing the component parts thereof together; and apparatus therefor that includes a table structure actuable to square and align assembled parts, and to compress self sustaining sheets of insulating material within spaces therebetween.

7 Claims, 7 Drawing Figures

INSULATED WALL SECTIONS AND METHODS OF AND APPARATUS FOR PREFABRICATING THE SAME

This is a division of application Ser. No. 944,268 filed Sept. 21, 1978, now abandoned.

BACKGROUND

1. Field of the Invention

The present invention is concerned with prefabricated structures generally and, more particularly, with an improved type of insulated wall or other section for use in erecting such structures.

2. The Prior Art

Prefabricated buildings of various kinds are of course known; and the term is applicable to practically any structure that has one or more of its parts made up separately and thereafter joined together with other parts into a complete unit.

Because of potential cost savings, the idea of building houses in this way has seemed attractive, and has found some commercial acceptance.

To date, however, such houses have proved generally inferior to conventionally built structures, and have presented serious production and erection problems that have notably increased costs as well as detracting from the quality of the finished product.

SUMMARY OF THE INVENTION

The present invention, on the other hand, provides a wall section with structural and insulating properties superior to those in conventionally built houses, together with a method of and apparatus for fabricating such sections that insures their component parts being uniformily squared and aligned, and their insulating materials being permanently held in intimate contact with their framing members.

Accordingly, it is an important object of this invention to provide improved insulated building wall sections that can be prefabricated at a central location or factory, utilizing production line techniques, and then shipped, together with other suitable complemental prefabricated sections as a package, to a building site for assembly into a finished house.

Another object is to provide a method and apparatus for use in prefabricating such wall sections that are capable of producing, and accurately reproducing, each wall section made, and of insuring that each will fit correctly and precisely with other sections into a complete building structure.

Further objects and advantages will become apparent during the course of the following description when taken in connection with the accompanying drawings.

In the drawings, wherein like numerals refer to like parts throughout:

DESCRIPTION OF A PREFERRED EMBODIMENT

Figure 1:
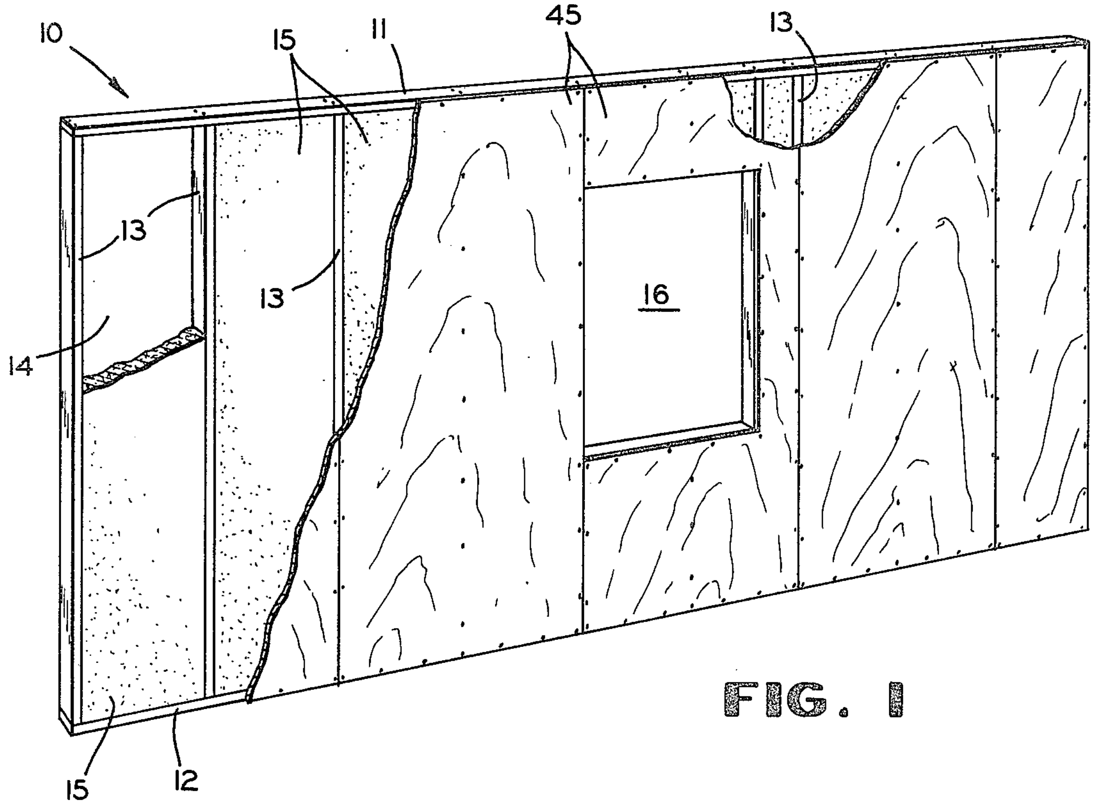
FIG. 1 is a perspective view of a representative wall section according to the invention, with portions broken away, and showing a framed window opening in the section.
Figure 2:
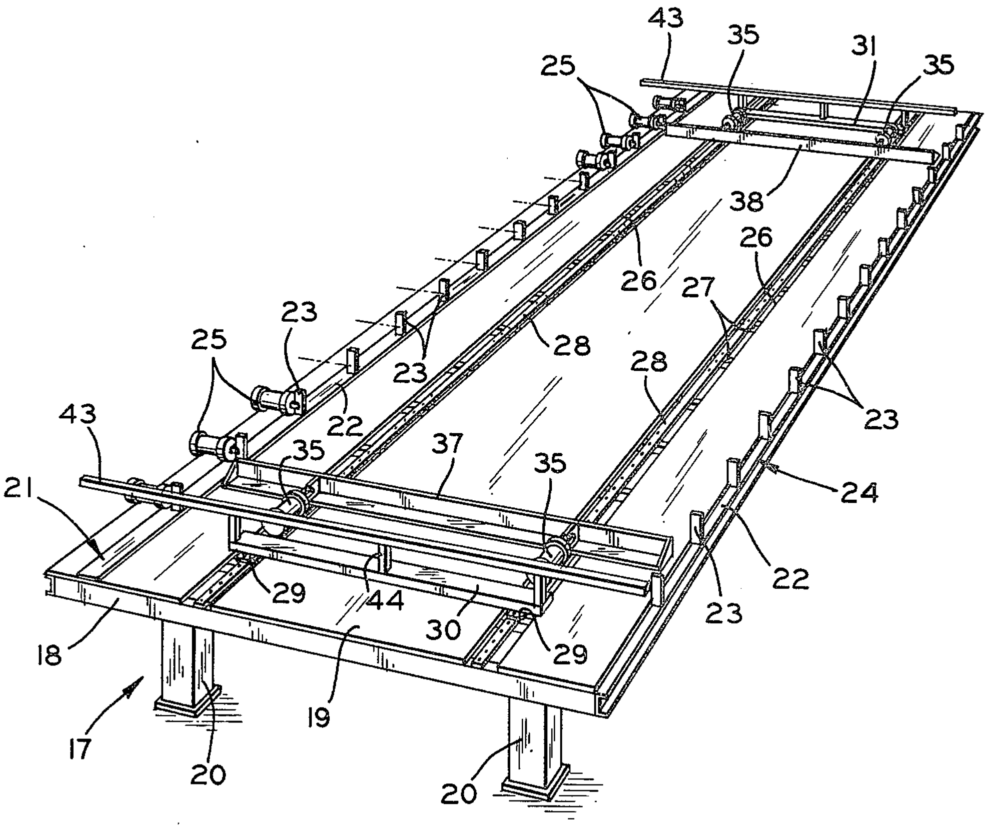
FIG. 2 is a perspective view of a preferred form of table structure for use in producing wall sections in accordance with the invention.

Referring now more particularly to the drawings, while it is to be understood that the wall sections of the invention may take a variety of shapes forms and sizes depending on the use to which they are to be put, there is illustrated in FIG. 1 a typical, rectangularly shaped wall section 10 such as can be employed, in practically any desired size, as a part of a side or end wall of a house or other building.

In a preferred form, the wall section 10 comprises a pair of longitudinally extending plates 11 and 12, as primary framing members, with a plurality of studs 13, extending therebetween and at right angles thereto, as secondary framing members which, with the primary members 11 and 12, define a plurality of openings 14 therebetween. The framing members 11 through 13 are preferably of 2″×6″ lumber and the openings 14 are filled with self sustaining sheets of a porous, foam, or similar type insulating material 15.

According to the invention the insulating properties of the sheet insulating material 15 is notably increased, and the possibility of air leakage through the wall is materially reduced, if not entirely eliminated, by the sheet insulating materials being placed under edge compression (in a manner to be more clearly hereinafter explained) that urges the insulating material into intimate contact with the surfaces of the framing members that are adjacent to it; and by the fact that the framing members are secured tightly together in a manner that maintains these sheets of insulating material under such edge pressure during the life of the wall section.

As part of the means for securing the framing members together they, along with the openings 13 and insulating material 14, are covered on their exteriors with plywood sheeting or the like 45 to close and finish the wall section structure.

To produce a wall section such as illustrated in FIG. 1, and which may or may not include a framed window opening as shown at 16, or a door or other opening or insert, there is provided a table assembly 17, illustrated in FIGS. 2 through 7, which includes a rectangularly shaped angle iron frame 18 having a slotted top 19 and is mounted on legs 20. Carried for sliding movement on and transversely of the table top 19 is a straight edge 21 made up of a flat elongated plate 22 extending along one side of the table top and having a series of equally spaced flat members 23 extending upwardly therefrom.

A similarly constructed straight edge 24 is fixedly mounted along the opposite side of the table top 19, and the straight edge 21 is adapted to be moved toward and away from the fixed straight edge 24 by a series of fluid operated pressure cylinders 25, operatively connected to the members 23, and mounted along and adjacent the side edge of the table top 19.

Within slots 26 in the table top, and supported on cross irons 27, are longitudinally extending rails 28 upon which are slideably mounted carriages 29, connected in pairs adjacent opposite ends of the table by angle irons 30 and 31. Each pair of carriages can be fixed in a desired position along the rails by means of pins 32 extending through the carriages and into appropriate holes 33 to a series of corresponding holes in the rails 28.

Supported on each carriage 29 is a fluid operated cylinder 35, operatively connected to one of two angularly shaped, transversely extending straight edges 37 and 38 at opposite ends of the table top; with the connection being made through bracing members 39 that connect the angled portions of each straight edge.

The straight edges 37 and 38 are supported for longitudinal reciprocal movement on rollers 40 running on the rails 28, and are maintained in alignment by the angular guide members 41 and 42. To facilitate adjustment of the pairs of carriages and their respective straight edges 37 and 38 to desired opposing positions along the rails 28, hollow handles 43, mounted above the connecting angle irons 30 and 31 on uprights 44, are provided.

In producing a wall section 10, plates 11 and 12, in the form of 2×6's, are arranged on edge at opposite sides of the table top 19 (FIG. 3) and with plate 12 against the fixed straight edge 21. Studs 13 are then positioned between the plates, in contact with the plate 12, and at substantially right angles thereto to define openings or spaces 14 between the plates and studs.

At this time window, door or other framing may be located in openings between the studs and plates, if and where desired. In this connection, while the studs 13 are usually spaced equidistantly, and normally about 24 inches apart, their spacing can be adjusted to accommodate practically any size and shape of frame as indicated by their arrangement in connection with the framed window opening 16 in FIG. 1.

In any event, with or without such framings, all other parts of the openings 14 between the assembled studs and plates are substantially filled with insulating material by positioning therein self sustaining sheets of a porous material such as expanded polystyrene or the like. These sheets are preferably slightly wider (for example 1/16 of an inch) than the openings 14, and must be of greater length than the openings in which they are positioned, so as to extend outwardly therefrom beyond the ends of the studs as shown at 46 (FIG. 3).

Figure 4:
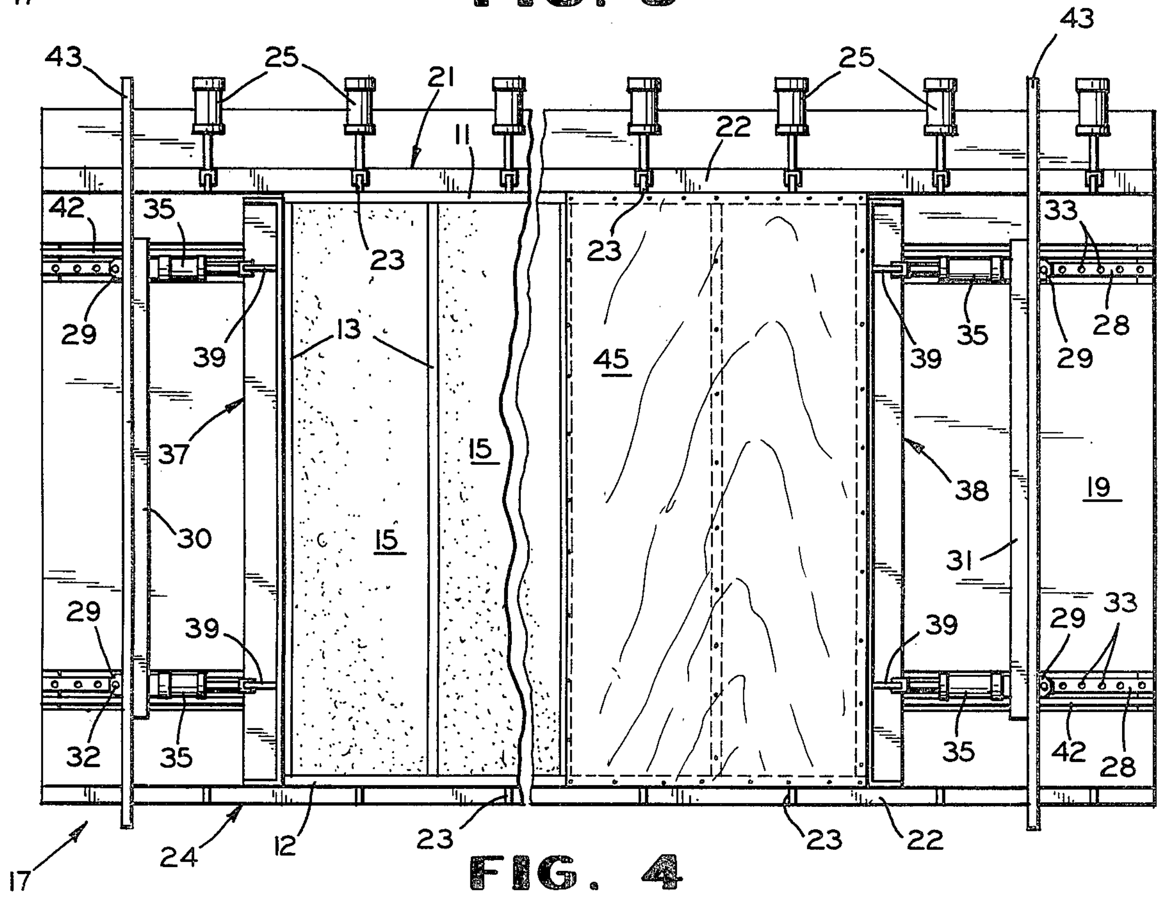
FIG. 4 is a view similar to FIG. 3, but showing the wall section nearly completed, and the parts of the table structure in the positions they occupy after the framing members of the wall section assembly have been squared and aligned and the sheet insulating material has been compressed and is being urged into intimate contact with adjacent surfaces of the framing members.
Figure 5:
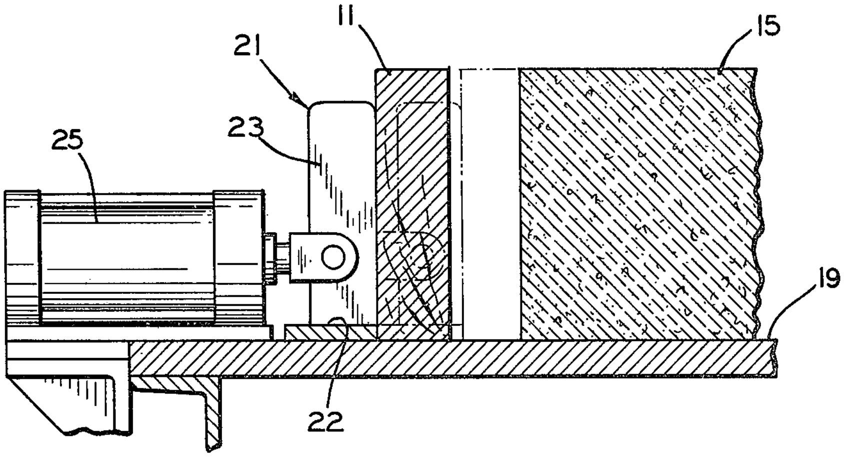
FIG. 5 is a vertical, sectional view taken substantially along the line 5—5 in FIG. 3.
Figure 6:
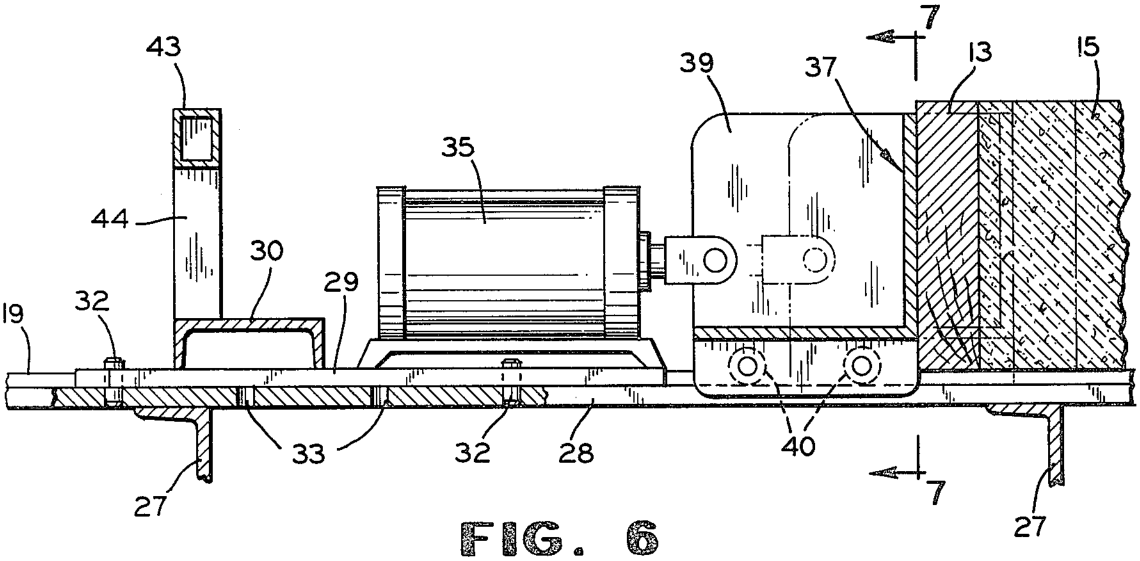
FIG. 6 is a similar section, taken along the line 6—6 in FIG. 3.
Figure 7:
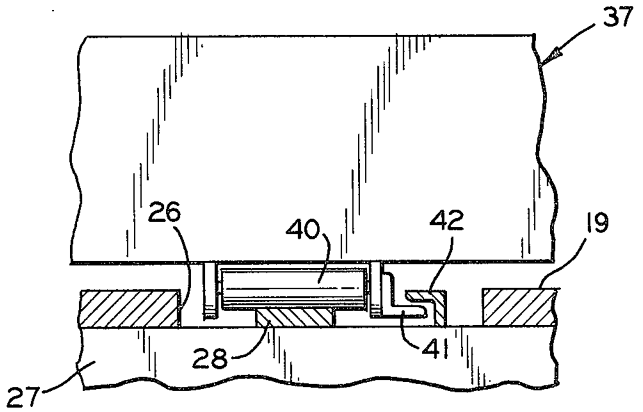
FIG. 7 is a vertical, sectional view taken along the line 7—7 in FIG. 6.

The cylinders 35 are then actuated to move the transverse straight edges 37 and 38 toward each other, preferably in sequence, to square and align the plates and studs. Along the movement of the transverse straight edge 38, the longitudinal straight edge 21 is forced, by action of the fluid cylinders 25, against the plate 12 to cause the plate to contact the edges of the outwardly extending portions 46 of, and so compress, the sheets 15 of insulating material while the plate is being brought into tight engagement with the ends of the studs as shown in FIG. 4.

Figure 3:
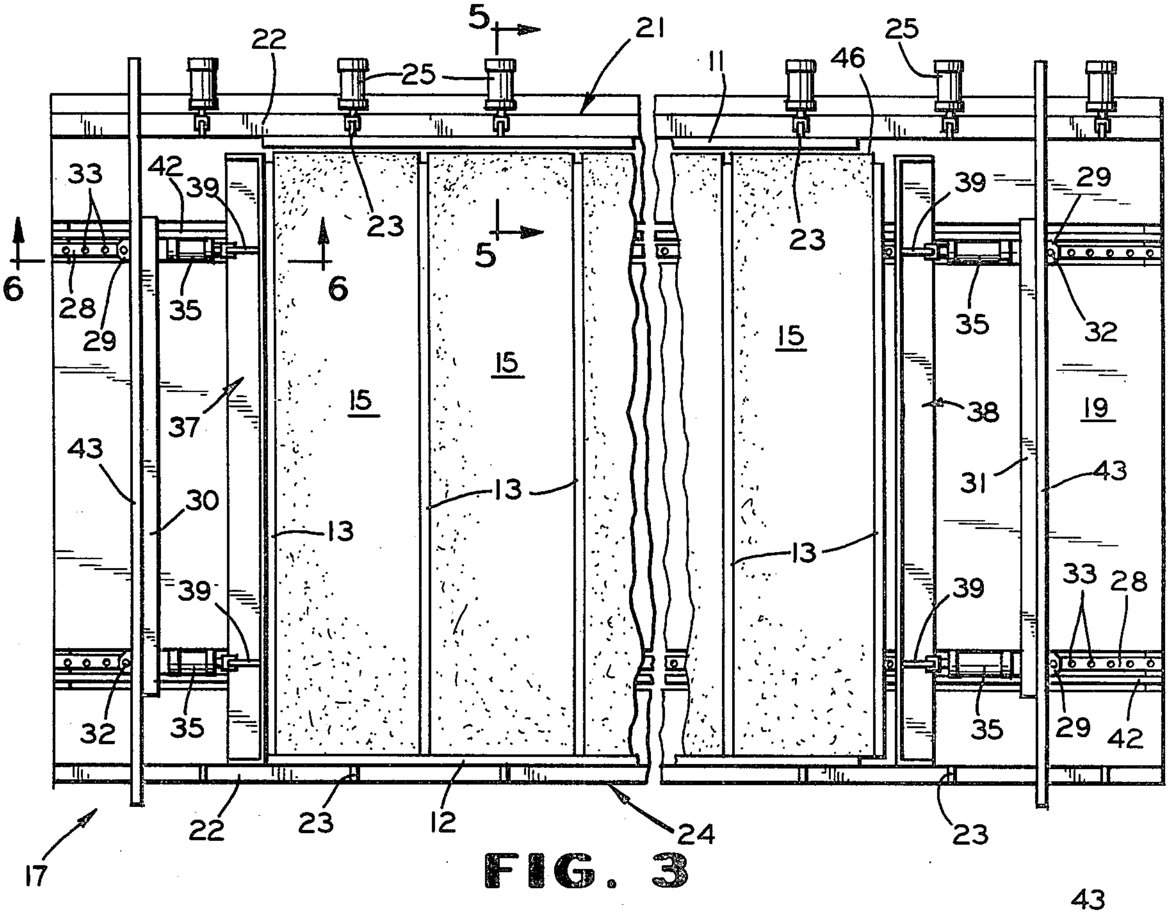
FIG. 3 is a plan view, on an enlarged scale, of the opposite ends of the table structure of FIG. 2, with the middle portion broken away, and showing an assembly of framing members and sheet insulating material for a wall section arranged on the table prior to maneuvering them into proper engagement and securing them together into a completed section.

As illustrated in FIG. 3, in addition to the sheets 16 extending lengthwise beyond the ends of the studs at 46 (a distance preferably of ⅛" per foot of sheet length), the assembly of studs and insulating material also extends laterally beyond the right hand ends of the plates 11 and 12. This latter condition can result from spaces left between the insulating material and studs during assembly and/or because the sheets of insulating material are cut slightly wider as well as longer, than the openings 14. In the latter case the sheet insulating material will be compressed by pressure exerted against its long edges by the straight edge 38 acting through the studs 13, as well as by the pressure exerted against its short edges by the straight edge 21 acting through the plate 11.

In any event, however, the important thing is that the sheets of insulating material are always compressed by pressure exerted against at least one of their edges, in this case at least against the short edges, to an extent sufficient to urge the material into intimate contact with all parts of the surfaces of both the plates and studs that are adjacent to it.

In this way complete insulation of all open areas between and around the framing members of the wall is ensured, openings, cracks and joints are effectively sealed, and the possibilities of air leakage is minimized at every point.

As mentioned above, the straight edges 37 and 38 are preferably moved in sequence, and the stroke of the cylinders operating the straight edge 37 is preferably less than that of the cylinders operating the straight edge 38; also movement of the straight edge 21 preferably follows the movement of the straight edge 38. More specifically, the straight edge 37 is moved the full length of the relatively short stroke (for example 2") of its operating cylinders to cause it to act, with the fixed straight edge 24, to square and align the assembled parts of the wall section. Immediately thereafter the straight edge 38, and then the straight edge 21, are moved by their respective operating cylinders until the resistance encountered when the insulation has been compressed and the framing members have been brought into contact, overcomes the thrust of these cylinders.

With the frame members thus being held in tight engagement and the sheets of insulating material being held under edge compression by the action of the fluid (preferably air) actuated cylinders 25 and 35, these conditions are maintained and preserved in the completed unit by securing the framing members together, first by nailing the plates 11 and 12 to the ends of the studs 13 through the recesses formed by the spacing of the uprights 23 on the elongated plates 22 of the straight edges 21 and 24, and then by nailing layers of ¼" thick plywood sheeting 45 to the plates and studs, on what is to be the outside of the unit, to completely cover that side of these framing members as well as the insulating material in the spaces between them.

The so completed wall section will be precisely squared and aligned and will have the insulation therein completely and tightly closing all openings and under edge compression that is continually urging it into intimate contact with every adjacent surface of its framing members.

Thereafter, nailing boards or the like can be applied to the top, bottom or ends of the wall section and, when used to secure the section to a foundation, or for splicing it or connecting it at corners with other sections, will facilitate and assure their being readily and accurately joined together.

It is to be understood that the forms of the invention herein shown and described are to be taken as preferred embodiments only, and that various changes in the size, shapes and arrangements of parts, as well as various structural and procedural changes may be made without departing from the spirit of the invention as defined in the following claims.

I claim:

1. In a method of producing prefabricated insulated wall sections, the steps of arranging a plurality of framing members in angular relation to one another to define an opening therebetween, positioning porous insulating material in self sustaining sheet form in said opening to substantially fill the same and extend outwardly therefrom at one side thereof, bringing each of said members into engagement with another and with one of said members exerting pressure against an edge of the outwardly extending portion of said insulating material to compress said sheet and urge said insulating material against and into intimate contact with adjacent surfaces of said opening defining framing members, and securing said framing members together in said engaged relationship and with said sheet insulating material under said edge pressure.

2. A method as defined in claim 1, in which a plurality of said openings are defined by arranging as said framing members a pair of plate members in spaced face to face relation with a plurality of studs between and in angular relation thereto, said insulating material is positioned in said openings to extend outwardly beyond ends of said studs, one of said plates is moved toward the other to bring said plates and the ends of said studs into engagement and to compress and urge said sheet insulating material into intimate contact with surfaces of said studs and plates adjacent thereto.

3. A method as defined in claim 2, in which each of said framing members is brought into tight engagement with another, and said arranged framing members are aligned and squared before securing them together.

4. In apparatus for producing prefabricated insulated wall sections; a table, for receiving an assembly made up of longitudinal framing members arranged in spaced face to face relation, with a plurality of spaced studs between and in angular relation thereto to define a plurality of openings therebetween, and with self sustaining sheets of porous insulating material substantially filling said openings and extending outwardly beyond ends of said studs; a longitudinal straight edge along one side of said table against which one of said longitudinal framing members can be positioned to locate said assembly; transverse straight edges at opposite ends of said table mounted for movement toward and away from one another in a direction parallel to said longitudinal straight edge; a second longitudinal straight edge at the opposite side of said table from said first longitudinal straight edge and mounted for movement toward and away from the same in a direction parallel with said transverse straight edges; means for moving said transverse straight edges against studs in said assembly that are adjacent thereto; and means for moving said second longitudinal straight edge against another of said longitudinal framing members, whereby to cause said other longitudinal framing member to in turn exert edge pressure against said outwardly extending portions of said sheets of insulating material and force the same into said openings, while squaring aligning and retaining the component parts of said assembly in contacting relationship so that they can be secured together with said sheets of insulating material under said edge pressure that is urging said material into intimate contact with adjacent studs and framing members.

5. A table as claimed in claim 3, in which said means for moving said transverse straight edges and said second longitudinal straight edge are fluid actuated pressure cylinders operatively connected therewith.

6. A table as claimed in claim 5 in which a plurality of pressure cylinders are provided for moving each of said movable straight edges, and the fluid actuated pressure cylinders moving the transverse straight edge at one end of said table have a longer thrust than the fluid actuated pressure cylinders moving the transverse straight edge at the opposite end of said table.

7. A table as claimed in claim 5, in which said longitudinal straight edges are recessed to permit nailing of said longitudinal framing members to said studs.

* * * * *